United States Patent Office 3,198,664
Patented Aug. 3, 1965

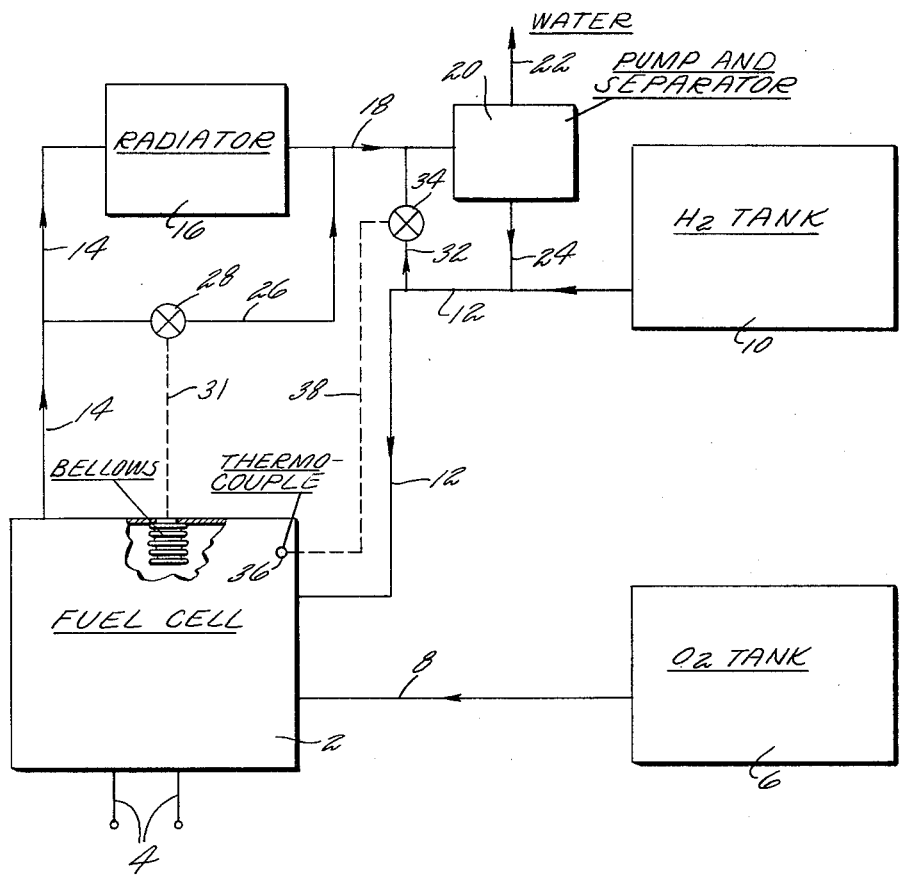

3,198,664
FUEL CELL SYSTEM
Harold Russell Kunz, Vernon, Conn., assignor to United Aircraft Corporation, East Hartford, Conn., a corporation of Delaware
Filed Nov. 30, 1961, Ser. No. 155,957
10 Claims. (Cl. 136—86)

This invention relates to a fuel cell system in which the cell temperature and/or pressure is controlled to maintain desired cell operation.

One feature of the invention is the control of the cell temperature in a cell in which an excess of fuel is supplied to the cell by controlling the flow of fuel through the cell, either controlling the quantity or temperature of the returned fluid.

Another feature is the control of cell temperature by adjusting the flow of excess fluid, used for cooling, through the cell.

One feature is the removal of the products of cell operation as a function of electrolyte level within the cell. In a hydrogen-oxygen cell the product of cell operation is water and this is removed with the excess of the fuel, which is hydrogen. Another feature is the maintenance of a constant cell electrolyte level by adjusting the rate of removal of the water or other products of cell operation.

Other features and advantages will be apparent from the specification and claims, and from the accompanying drawing which illustrates an embodiment of the invention.

The single figure is a diagrammatic view of a fuel cell system.

The fuel cell 2 which has the electrical leads 4 for the cell output is supplied with an oxidant under pressure from a tank 6 through a supply conduit 8 and with a fuel under pressure from a tank 10 through a conduit 12. In the arrangement shown, the cell is a hydrogen-oxygen cell, the fuel is hydrogen and the oxidant is oxygen.

The cell is so arranged that an excess of fuel (hydrogen) is supplied to the cell and this excess of fuel is discharged through an outlet conduit 14. The excess fuel takes with it the exhaust products of the cell which in this case is water vapor. The excess hydrogen and the water vapor in the conduit 14 pass through a radiator 16 in which the hydrogen and water vapor are cooled and in which at least a part of the water vapor is condensed to a liquid form. From the radiator the hydrogen and the water is delivered through a conduit 18 to a pump and separator combination 20. The separator which may be any well-known type of separator such as the centrifugal type of Topanelian Patent 2,575,568 removes the liquid water from the hydrogen and this water is discharged through a discharge pipe 22. The hydrogen from the pump and separator is delivered through a conduit 24 to the hydrogen supply conduit 12.

For the purpose of controlling the operating temperature of the fuel cell and assuring adequate removal of the water vapor formed during the operation of this cell, the system also includes a bypass conduit 26 for the radiator 16 and this conduit has a valve 28 therein which is operated in response to an electrolyte volume sensing device 30 located within the fuel cell and connected by a lead 31 to the valve 28. This device is shown as a bellows and is so arranged that as the volume of electrolyte within the fuel cell increases due to water accumulation, thus increasing the volume, the bellows will be compressed thereby tending to close the valve 28. Alternately, as the amount of electrolyte in the cell decreases the bellows will expand and will move the valve 28 toward the full open position thereby increasing the amount of fluid bypassing the radiator 16. Obviously, the more fluid that bypasses the radiator the less water will be condensed and less heat will be extracted from the gaseous hydrogen.

In addition to the valve 28 which is responsive to a change in the amount of electrolyte in the cell, the system has a bypass conduit 32 around the pump and separator 20. In the conduit 32 is a valve 34, the position of which is varied as a function of the fuel cell temperature as by a thermocouple 36 positioned within the cell and connected to the valve by a lead 38. The position of the valve 34 obviously controls the quantity of excess hydrogen that is circulated through the cell. Thus, if the temperature of the fuel cell exceeds the desired level, the valve 34 will be moved toward a closed position thereby reducing the amount of hydrogen that is returned to the pump inlet and increasing the amount of hydrogen delivered to the cell through the supply line 12. This increase in the quantity of hydrogen will effectively lower the temperature of the fuel cell.

The increase in the flow of hydrogen through the cell will increase the quantity of water removed from the cell which will cause the bellows 30 to expand and open the valve 28 thereby reducing the amount of water condensed in the radiator and thus the amount of water removed from the excess hydrogen. Since the opening of the valve 28 for an increase in the fluid bypassing the radiator results in less cooling effect, the recirculated hydrogen will be less cool and may not remove an adequate amount of heat so that the valve 34 will be closed somewhat further. However, with the increase in the quantity of water vapor in the hydrogen, since it was not all condensed out in the radiator, the excess hydrogen being circulated will pick up a less quantity of water vapor and the level of the electrolyte will be restored to the desired level.

It is to be understood that the invention is not limited to the specific embodiment herein illustrated and described, but may be used in other ways without departure from its spirit as defined by the following claims.

I claim:

1. In a fuel cell control device, a fuel cell, means for supplying oxidant and fuel under pressure to said cell, a discharge conduit for removing the products of oxidation and excess fuel from said cell, a heat exchanger connected to said conduit for receiving and for cooling said discharge products, a separator through which the cooled products are directed for removing the liquid products of oxidation from the excess fuel, a pump receiving the fuel from the separator for returning the excess fuel to the fuel supply means, a bypass for the fuel around the heat exchanger and valve means for controlling the amount of fuel bypassing the heat exchanger.

2. A device as in claim 1 in which the valve means is responsive to fuel cell electrolyte level.

3. A device as in claim 1 in which the cell has an electrolyte level sensing means and the valve means is responsive to said sensing means.

4. A device as in claim 1 in which there is a second bypass, said second bypass extending around the pump, and a control valve in said second bypass to control the amount of fuel returned to the fuel supply means by controlling the amount of fuel recircling the pump.

5. A device as in claim 4 in which said control valve is responsive to cell temperature.

6. A device as in claim 4 in which said cell has a temperature sensing means and said control valve is movable in response to the temperature sensing means.

7. In a fuel cell control device, a fuel cell, means for supplying oxygen and hydrogen under pressure to said cell, a discharge conduit for the exhaust products including excess hydrogen and water vapor from said cell, a radiator for cooling the exhaust products to condense at least a part of the water, means for separating the excess hydrogen and water vapor from the liquid water and returning the hydrogen and water vapor to the hydrogen supply means, a bypass around said radiator and valve means for controlling the flow of exhaust products around said radiator.

8. A device as in claim 7 in which the valve means is responsive to electrolyte level changes in the cell.

9. A device as in claim 7 in which the cell has an electrolyte level sensing device and the valve means is moved to control the flow of exhaust products in response to said electrolyte level sensing device.

10. A device as in claim 7 in which there is another bypass around the pump, a control valve in said another bypass, and temperature sensing means in the cell for controlling said control valve.

References Cited by the Examiner

UNITED STATES PATENTS

| | | | |
|---|---|---|---|
| 2,384,463 | 9/45 | Gunn et al. | 136—86 |
| 2,901,524 | 8/59 | Gorin | 136—86 |
| 3,002,039 | 9/61 | Bacon | 136—86 |
| 3,014,976 | 12/61 | Blackmer | 136—86 |
| 3,080,442 | 3/63 | Hobert | 136—86 |

JOHN H. MACK, *Primary Examiner.*

JOHN R. SPECK, ROGER L. CAMPBELL, *Examiners.*